US011358642B2

United States Patent
Estiot et al.

(10) Patent No.: US 11,358,642 B2
(45) Date of Patent: Jun. 14, 2022

(54) MOTOR VEHICLE FRONT CRADLE STRUCTURE MADE OF RIVETED AND BONDED ALUMINIUM

(71) Applicant: RENAULT s.a.s., Boulogne-Billancourt (FR)

(72) Inventors: Christophe Estiot, Dreux (FR); Jonathan Ferreira, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 386 days.

(21) Appl. No.: 16/485,583

(22) PCT Filed: Feb. 2, 2018

(86) PCT No.: PCT/EP2018/052680
§ 371 (c)(1),
(2) Date: Aug. 13, 2019

(87) PCT Pub. No.: WO2018/149668
PCT Pub. Date: Aug. 23, 2018

(65) Prior Publication Data
US 2019/0359259 A1 Nov. 28, 2019

(30) Foreign Application Priority Data
Feb. 15, 2017 (FR) .................................. 17 51210

(51) Int. Cl.
*B62D 21/11* (2006.01)
*B62D 21/03* (2006.01)
(Continued)

(52) U.S. Cl.
CPC .............. *B62D 21/11* (2013.01); *B62D 21/03* (2013.01); *B62D 27/023* (2013.01); *B62D 29/008* (2013.01)

(58) Field of Classification Search
CPC ........ B62D 21/02; B62D 21/03; B62D 21/11; B62D 27/023; B62D 27/026; B62D 29/008
See application file for complete search history.

(56) References Cited

U.S. PATENT DOCUMENTS 6,109,654 A * 8/2000 Yamamoto ........... B62D 21/152
180/299
6,880,663 B2 * 4/2005 Fujiki .................. B62D 21/155
180/232
(Continued)

FOREIGN PATENT DOCUMENTS

DE     197 44 312 A1    4/1999
DE  10 2014 005 007 A1   11/2014
(Continued)

OTHER PUBLICATIONS

International Search Report dated May 17, 2018 in PCT/EP2018/052680 filed on Feb. 2, 2018.
(Continued)

*Primary Examiner* — Joseph D. Pape
(74) *Attorney, Agent, or Firm* — Oblon, McClelland, Maier & Neustadt, L.L.P.

(57) ABSTRACT

A motor vehicle cradle structure includes at least two longitudinal side rails made of aluminium or aluminium alloy which are spaced apart transversely and at least one crossmember, of transverse orientation, made of aluminium or of aluminium alloy, which connects together the two longitudinal side rails. The crossmember is secured to the longitudinal side rails in a non-dissociable manner by bonding in combination with a fastening using rivets. The surfaces bonded together are spaced apart by a determined dimensional clearance able to accept glue or an adhesive agent.

20 Claims, 10 Drawing Sheets

(51) Int. Cl.
*B62D 27/02* (2006.01)
*B62D 29/00* (2006.01)

(56) References Cited

U.S. PATENT DOCUMENTS

| | | | |
|---|---|---|---|
| 9,340,229 B2* | 5/2016 | Gabbianelli | B60K 5/1216 |
| 2016/0200182 A1* | 7/2016 | Ogawa | B21D 39/028 |
| | | | 403/267 |
| 2017/0008565 A1* | 1/2017 | Murata | B62D 29/008 |

FOREIGN PATENT DOCUMENTS

| | | |
|---|---|---|
| DE | 10 2014 005 010 A1 | 11/2014 |
| DE | 10 2013 225 080 A1 | 6/2015 |
| EP | 1 010 606 A1 | 6/2000 |
| WO | WO-9632594 A1 * 10/1996 | ................ C09J 5/00 |

OTHER PUBLICATIONS

Preliminary French Search Report dated Oct. 11.2017 in French Application No. 1751210 filed on Feb. 15, 2017.

\* cited by examiner

MOTOR VEHICLE FRONT CRADLE STRUCTURE MADE OF RIVETED AND BONDED ALUMINIUM

TECHNICAL FIELD OF THE INVENTION

The invention relates to a motor vehicle cradle structure made of aluminum or aluminum alloy.

TECHNICAL BACKGROUND TO THE INVENTION

The invention relates more specifically to a cradle structure, notably a motor vehicle front cradle structure, that is very lightweight.

In this regard, making all or part of a front cradle structure from aluminum, and in particular the lateral longitudinal side rails and the one or more front and/or rear cross members thereof has already been proposed.

Such a structure must have different features, notably in terms of rigidity and capacity to absorb energy in the event of impact, and it must also guarantee the anchoring of the structure to the body structure of the vehicle.

The structure must also easily incorporate the different fastening interfaces for the suspension components, such as wishbones.

Equally, it must also be possible to easily and rigidly fasten other equipment or accessories such as a steering rack system of the vehicle in the case of a front cradle structure.

The assembly and connection of the main components of the cradle structure must guarantee a precise relative positioning of these components, while simultaneously ensuring sufficient mechanical strength of the assembly.

In the case of an aluminum cradle structure, realizing the different assemblies by welding has already been proposed.

Such a technique requires assembly and pre-positioning means that are complex to implement, notably for small- or medium-scale vehicle production for which such investments may be incompatible.

In order to reduce such investments, realizing a simple assembly with no structural assembly means related to a production unit is proposed.

Using assembly and fastening techniques by bonding in combination with fastening by rivets is therefore proposed.

This type of assembly, by virtue of the use of rivets, guarantees alignment of the parts in relation to one another.

The use of series of rivets makes it possible to press the bonded surfaces together without using additional clamping means, which are conventionally built into assembly facilities, for example to carry out the welding technique.

The invention is intended to propose an improvement of such a motor vehicle cradle structure in order to improve the rigidity thereof, notably through the reliability of the bonding assemblies.

SHORT SUMMARY OF THE INVENTION

For this purpose, the invention proposes a motor vehicle cradle structure comprising:
- at least two longitudinal side rails made of aluminum or aluminum alloy that are spaced apart transversely,
- at least one transversely oriented cross member that is made of aluminum or of aluminum alloy and that connects the two longitudinal side rails together, in which structure the cross member is secured to the longitudinal side rails in a non-dissociable manner by bonding in combination with a fastening using rivets, characterized in that surfaces bonded together are spaced apart by a determined dimensional clearance able to accept glue or an adhesive agent.

According to other features of the invention:
- at least one bonding zone has a surface provided with raised elements that cooperate with a facing surface,
- the raised elements determine a substantially constant dimensional clearance between the surface and the facing surface,
- the surface provided with raised elements is a flat surface,
- the surface is provided with at least one raised contact,
- the flat surface is provided with a series of raised contacts distributed over said surface,
- the surface is provided with at least one raised rib,
- the surface is provided with a series of raised ribs distributed over the surface,
- each longitudinal side rail has at least one wall portion or one flange portion of which one surface is bonded and fastened using rivets to the cross member,
- the bonded surface is arranged at a longitudinal end of the longitudinal side rail,
- the bonded surface is a flat surface,
- each longitudinal side rail has two flange or wall portions, each of which has a flat surface, that are parallel and opposing and each of which is bonded and fastened using rivets to the cross member,
- the cross member has at least one wall portion or one flange portion of which one surface is bonded and fastened using rivets to a longitudinal side rail,
- the surface is arranged at a transverse end of the cross member,
- the surface is a flat surface,
- the cross member has two flange or wall portions, each of which has a flat surface, that are parallel and opposing and each of which is bonded and fastened using rivets to the longitudinal side rail,
- the surfaces bonded together are treated surfaces, notably treated by anodizing,
- the structure forms a motor vehicle front cradle, and the cross member is a front cross member of the front cradle,
- the structure has at least one supplementary element for mounting a component belonging to a suspension of the vehicle, and the element is made of aluminum and is secured to a longitudinal side rail and/or to the cross member in a non-dissociable manner by bonding in combination with a fastening using rivets,
- the structure includes at least one reinforcement plate that is made of aluminum or aluminum alloy and that is fastened to a longitudinal side rail and/or to the cross member in a non-dissociable manner by bonding in combination with a fastening using rivets,
- each longitudinal side rail and/or the cross member is a hollow-box element made of aluminum or aluminum alloy.

SHORT DESCRIPTION OF THE FIGURES

Other features and advantages of the invention will become apparent from reading the detailed description below, for the understanding of which reference is made to the attached drawings, in which.

DETAILED DESCRIPTION OF THE FIGURES

In the remainder of the description, elements that have the same structure or similar functions are referred to using the same reference signs.

In the remainder of the description, longitudinal, vertical and transverse orientations, indicated using the coordinate system L, V, T in the figures, shall be used nonlimitingly. A horizontal plane extending longitudinally and transversely is also defined.

Figure 1:
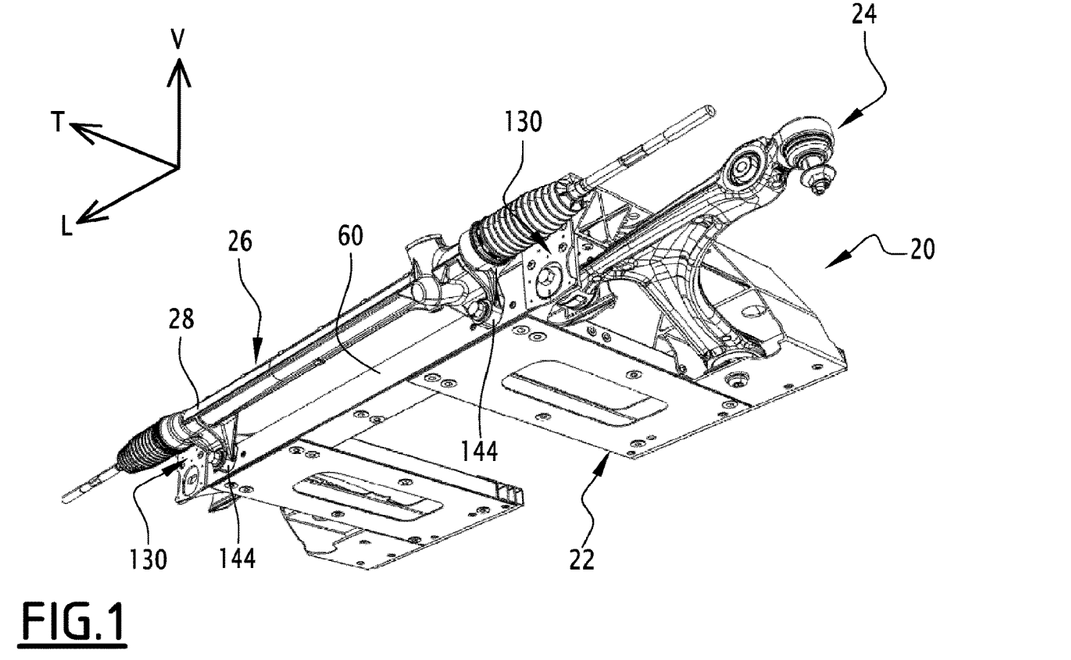
FIG. 1 is a front three-quarter perspective lower view of a motor vehicle front cradle structure according to the invention that is shown fitted with a front left lower wishbone and a steering rack system.
Figure 2:
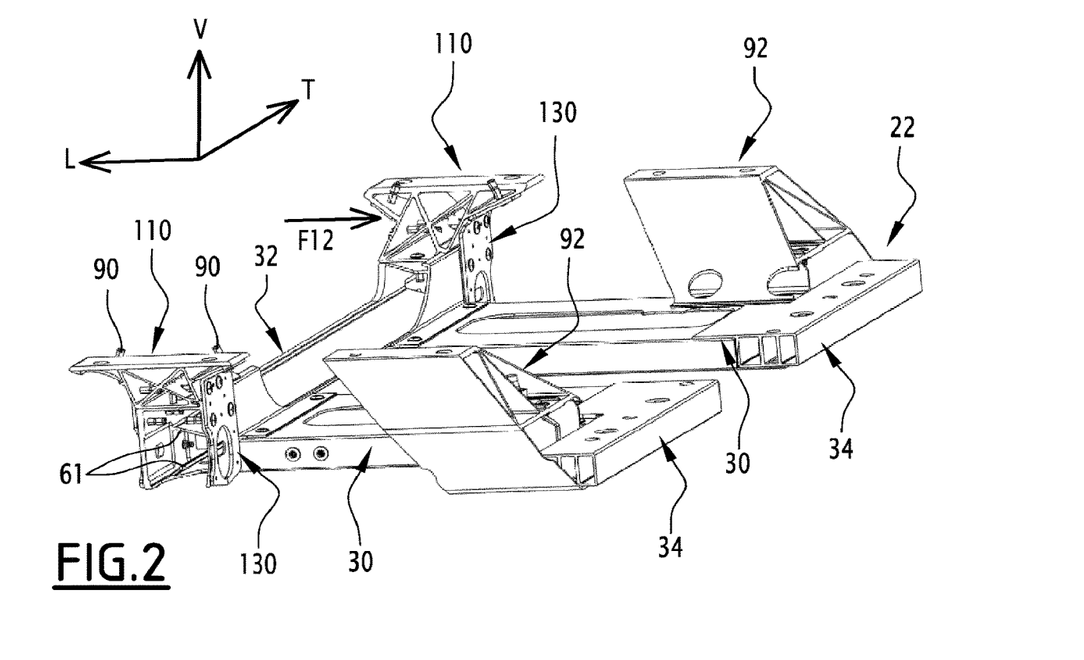
FIG. 2 is a rear three-quarter perspective top view of the cradle structure in FIG. 1.
Figure 3A:
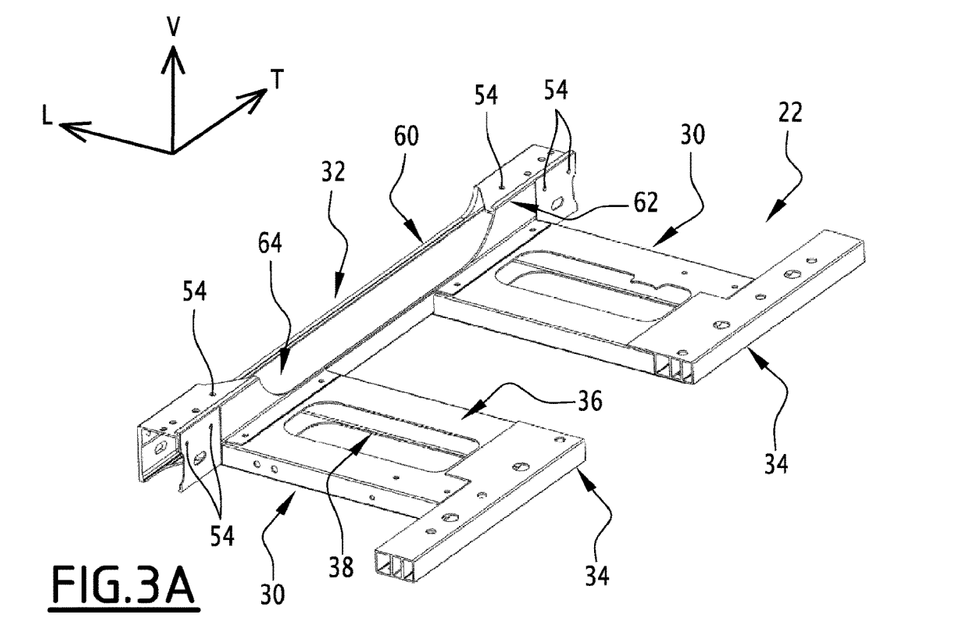
FIG. 3A is a view similar to the view in FIG. 2 that shows the cradle structure without the rear left and right housings thereof for fastening the cradle structure, without the two front left and right yokes thereof, and without the reinforcement plates thereof.
Figure 3B:
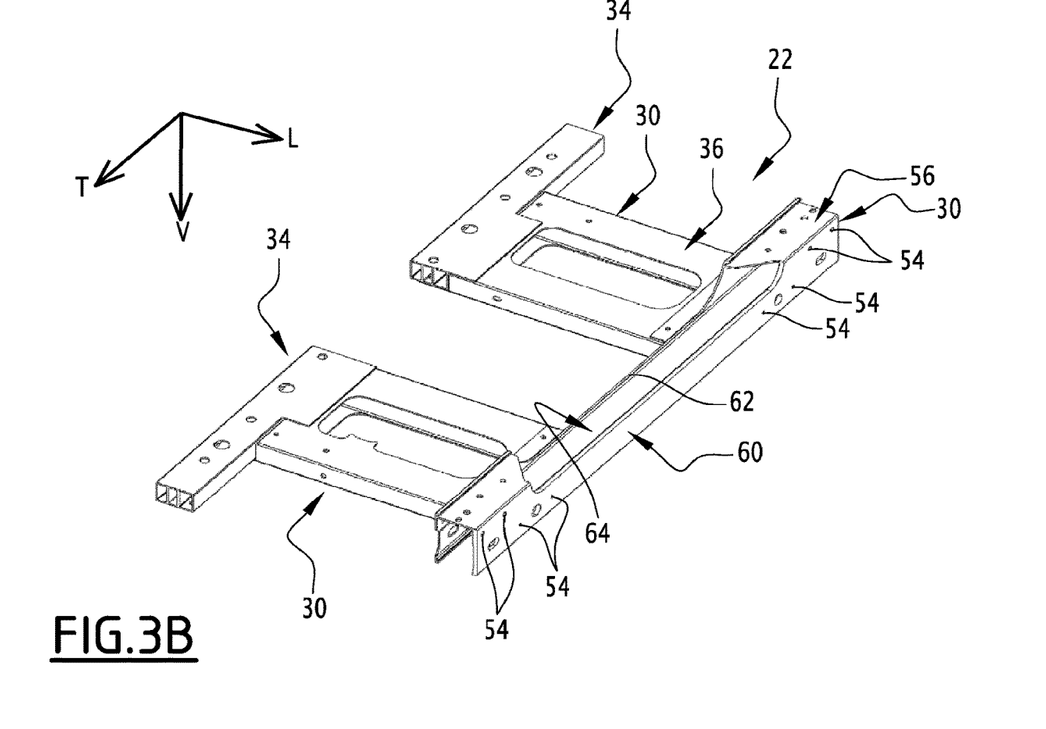
FIG. 3B is a view similar to the view in FIG. 3A from another angle.
Figure 4:
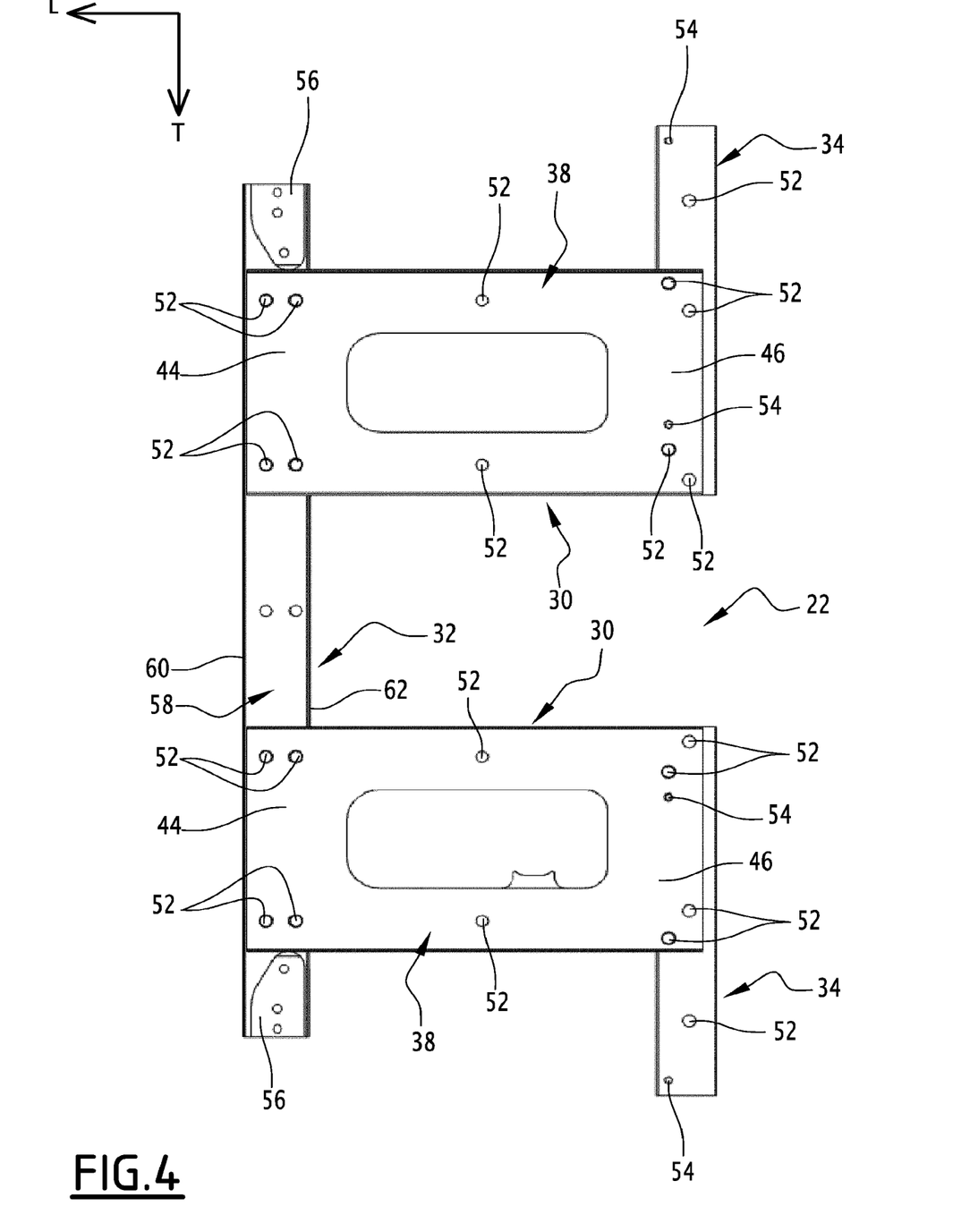
FIG. 4 is a top view of the assembly shown in FIGS. 3A and 3B.

FIG. 1 shows an assembly 20 comprising a front cradle structure 22 of a motor vehicle that is in this case fitted at the front with two front lower wishbones, of which only the front left lower wishbone 24 is shown.

The front cradle structure 22 is also fitted at the front with a steering rack system 26 of a known general design, that notably includes a transverse casing 28 fastened to the front cradle structure 22.

Figure 5:
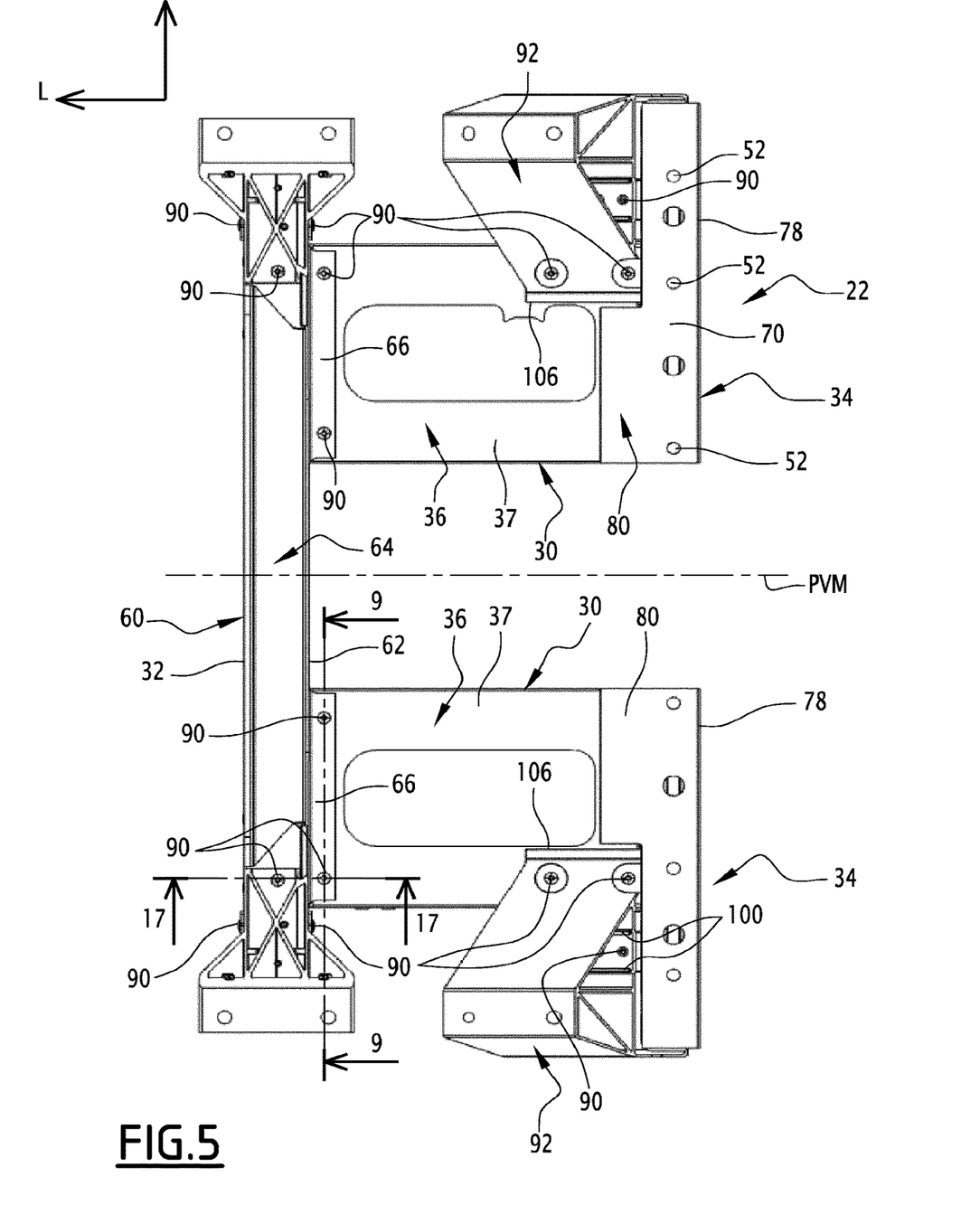
FIG. 5 is a top view of the assembly shown in FIG. 2.

The front cradle structure 22 has an overall symmetry of design in relation to the longitudinal median vertical plane PVM shown in FIG. 5.

The front cradle structure 22 essentially comprises two, left and right, lateral longitudinal side rails 30 that are spaced apart transversely from one another and in relation to the plane PVM, a front cross member 32 that is linked and fastened to the front ends of the longitudinal side rails 30, and two rear cross members (or two rear half cross members), each of which is linked to the rear end of a related longitudinal side rail 30.

The longitudinal side rails 30 and the cross members 32 and 34 are in this case made from aluminum or aluminum alloy sections, and the surfaces thereof are anodized.

These parts or components are for example parts obtained by extrusion molding, notably on account of the rigidity/lightness compromise that such a production technique enables.

Anodizing the aluminum or aluminum alloy parts notably ensures the best possible hold of the appropriate adhesive or glue between the different surfaces of these different structural elements that are fastened by bonding.

By way of example, the front cross member 32 is an extruded part anodized with Al 6082-HS, and the rear cross members 34 are extruded parts anodized with Al 6063-T66, like the longitudinal side rails 30.

Figure 11:
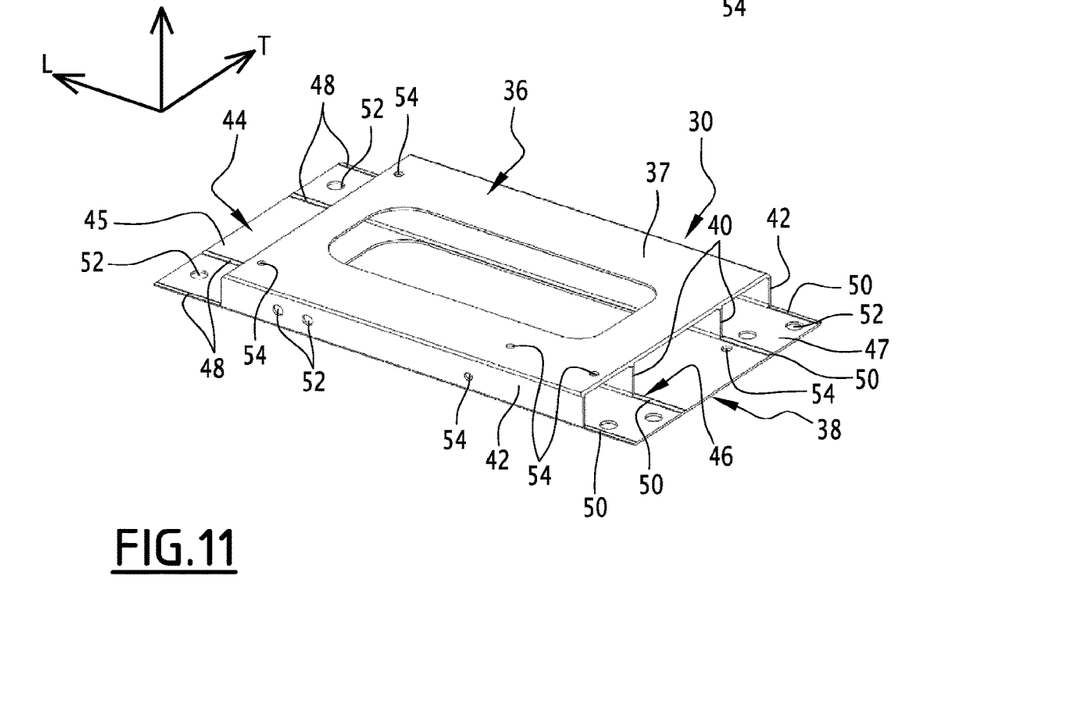
FIG. 11 is a perspective view of the left lateral longitudinal side rail of the cradle structure in FIGS. 3A and 3B.
Figure 12:
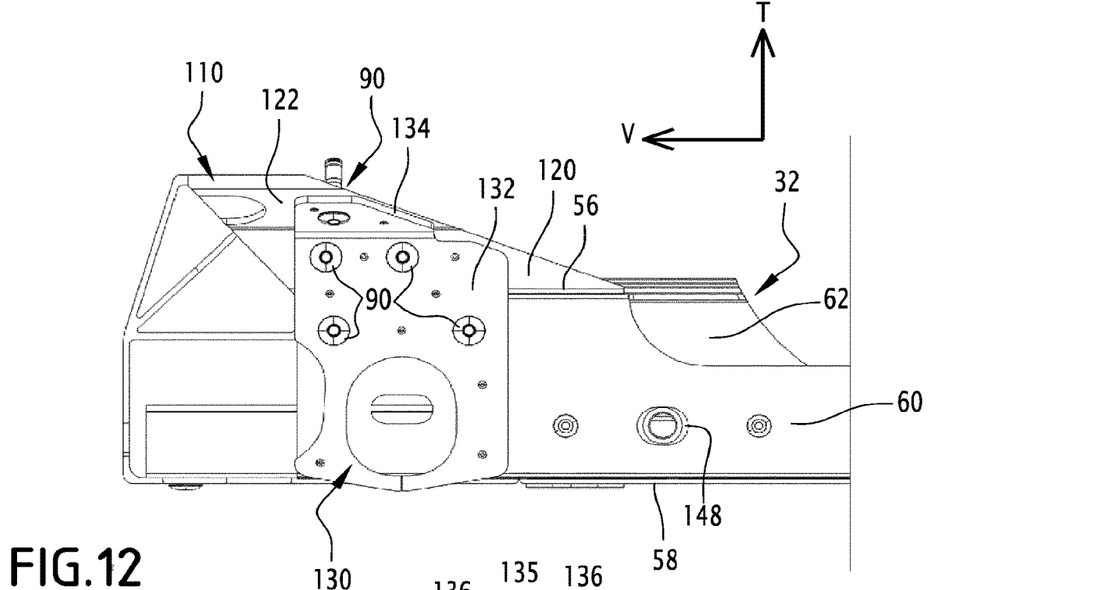
FIG. 12 is a detailed view taken along the arrow F12 in FIG. 2.

As shown in particular in FIG. 11, each longitudinal side rail 30 is a box which is flat in the horizontal plane that is delimited by a horizontal upper wall 36 and by a horizontal lower wall 38 that are linked together by two longitudinal internal vertical partitions 40 and two longitudinal vertical side walls 42.

The horizontal lower wall 38 is longer than the horizontal upper wall 36 and thus has two opposing extensions, specifically a front-end extension 44 and a rear-end extension 46, each a horizontal plate, of which the upper face 45, 47 respectively is provided with four raised ribs 48 and 50 respectively.

Thus, the flat ribbed surfaces 45 and 47 form bonding surfaces according to the invention that are provided with raised elements 48, 50.

As can be seen in FIG. 11, the extensions 44 and 46 may be provided with orifices 52 that are designed to receive, for example, indexing posts or similar, as well as holes 54 for receiving assembly rivets.

Similar holes 52 and 54 are also provided in the upper wall 36, in the side walls 42 and in the horizontal lower wall 38.

In the figures, all of the holes designed to receive a fastening rivet are indicated using reference sign 54 regardless of the part, and the related rivets are indicated using reference sign 90.

The upper faces of the front- and rear-end portions of the upper wall 36 of the longitudinal side rail 30 form smooth bonding surfaces that, as explained below, cooperate with matching bonding surfaces that have raised elements.

Figure 15:
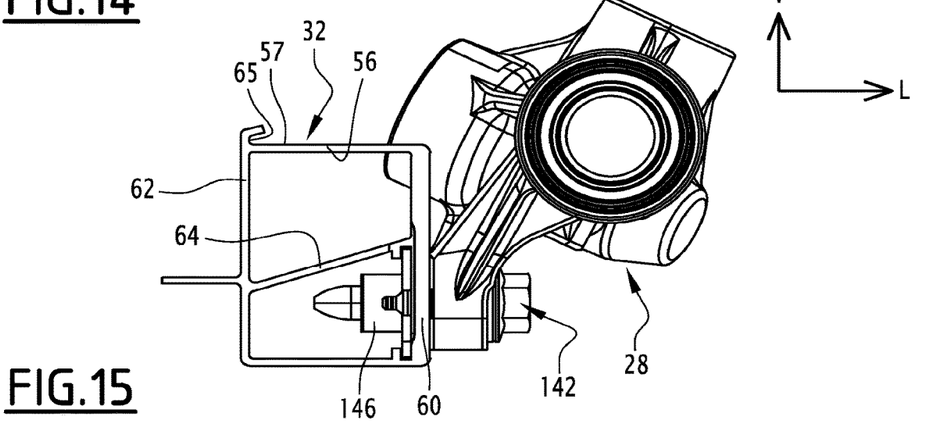
FIG. 15 is a side end view taken along the arrow F15 in FIG. 14.

The front cross member 32 is a section oriented generally transversely having an overall rectangular cross section (see FIGS. 15 and 16) that has a horizontal upper wall 56 that is partially cut out in the central portion thereof, a horizontal lower wall 58 that is partially cut out at the two opposing transverse ends thereof, a vertical front wall 60 of greater thickness, a rear vertical transverse wall 62, and an internal transverse strengthening flange 64 that is inclined in relation to the horizontal and that extends substantially along the entire length of the front cross member 32.

The upper wall 56 has a forward-opening horizontal slot 65 at each of the two opposing longitudinal ends.

In the vicinity of each of the two opposing transverse ends thereof, the vertical rear wall 62 of the front cross member 32 has, substantially halfway up, a longitudinal horizontal flange 66 that extends horizontally rearwards.

Each horizontal flange 66 is an assembly and fastening flange for the front cross member 32 on a facing portion of the upper face 37 of the upper wall 36 of a related longitudinal side rail 30.

For this purpose, the lower face 67 of each flange 66 is a bonding face that has in this case three raised longitudinal ribs 68.

Each horizontal flange 66 has two holes 54 for receiving assembly and fastening rivets designed to cooperate with the corresponding holes 54 of the front end portion of the upper face 37 of the upper wall 36 of the longitudinal side rail 30.

Figure 10:
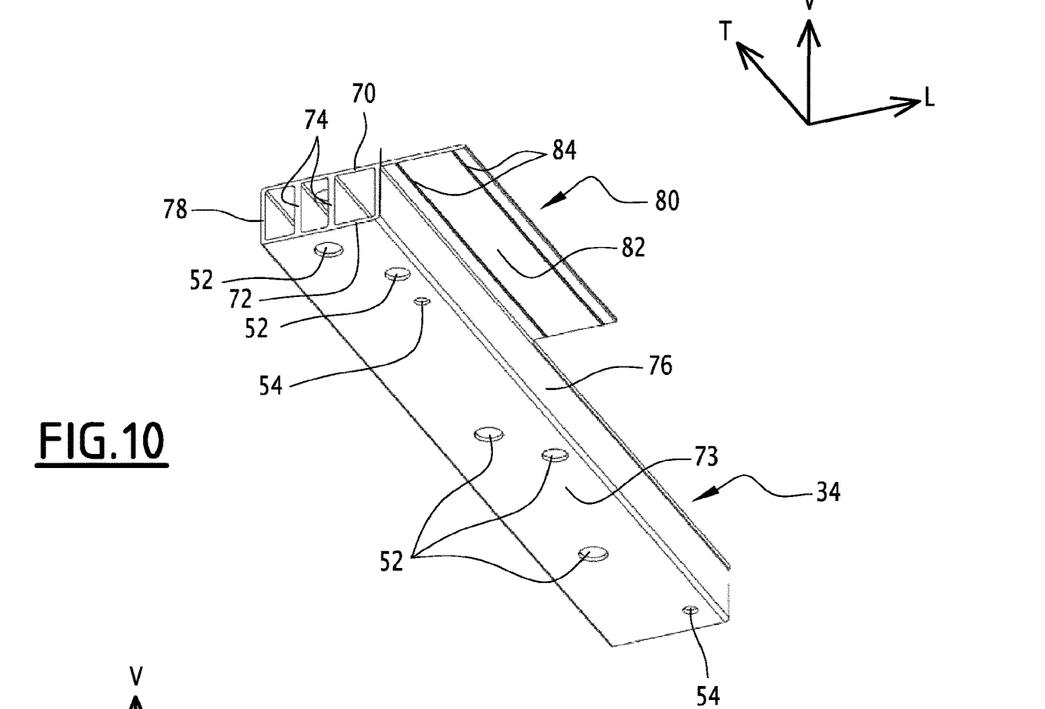
FIG. 10 is a perspective view of the rear left cross member.

As shown notably in FIG. 10, each rear cross member 34 is a section of rectangular cross section that is delimited by a horizontal upper wall 70 and a horizontal lower wall 72 that are linked together by two internal transverse vertical partitions 74 and by a front transverse vertical wall 76 and a rear transverse vertical wall 78.

All of the outer surfaces of the walls 70, 72, 76 and 78 in this case have smooth surfaces.

In the extension of the horizontal upper wall 70 thereof, the rear cross member 34 comprises a horizontal fastening and assembly flange 80 which extends longitudinally forwards.

The flange 80 has a lower bonding surface 82 that has two transverse ribs 84.

Each ribbed lower horizontal face 82 is designed to cooperate with a facing portion of the upper surface 37 of the rear end portion of the horizontal upper wall 36 of a related longitudinal side rail 30.

As shown notably in FIG. 10, the horizontal lower wall 72 of the rear cross member 34 has two holes 54 for fastening rivets, as well as a series of holes or orifices 52 designed to receive posts.

In summary and by way of a non-limiting example, the surfaces for assembly and fastening by bonding of the longitudinal side rails 30 with the front and rear cross members 32, 34 are in this case formed notably by the ribbed surfaces 67 and 82 of the flanges 66 and 80, as well as by the ribbed surfaces 45 and 47 of the extensions 44 and 46.

According to the teachings of the invention, the presence of the ribs 68, 84 or 48 and 50 makes it possible, in this case in cooperation with smooth opposing surfaces, to provide a space between the surfaces to be bonded that is a given dimensional clearance, for example of substantially constant value, that is able to receive glue or adhesive agent.

Figure 17:
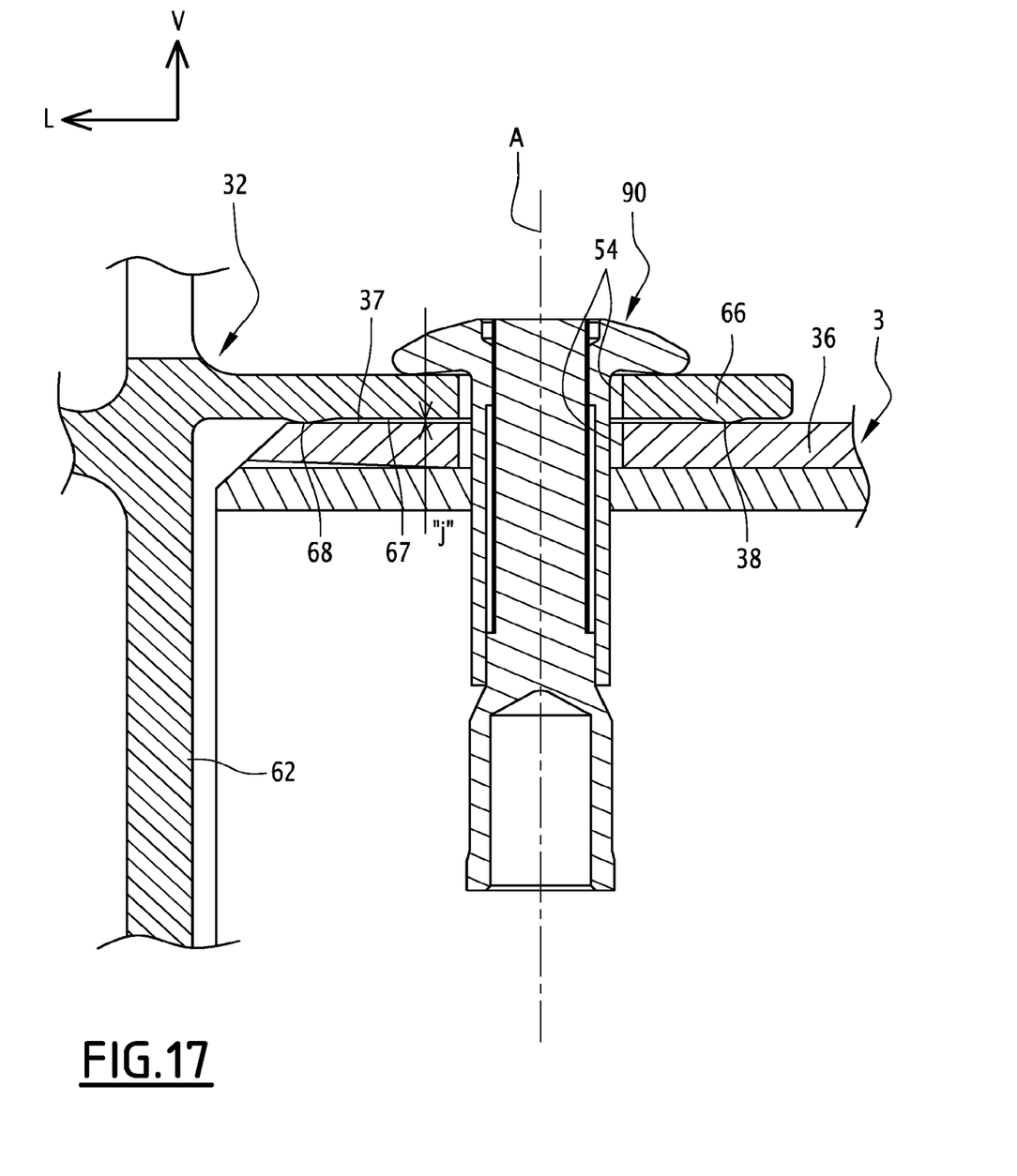
FIG. 17 is a large-scale detailed cross section view of an assembly and fastening rivet taken along the line 17-17 in FIG. 5.

This is shown in greater detail in FIG. 17 in which, in this case between the upper surface 37 of the upper wall 36 of a longitudinal side rail 30 and the ribbed lower surface 67 of a flange 66 of the cross member 30, there is a vertical clearance "j" that results from the bearing cooperation of the ribs 68 against the upper surface 37 of the horizontal upper wall 36 of the longitudinal side rail 30.

The assembly and clamping, in this case in the vertical direction, of the parts 30 and 32 assembled by bonding is provided by means of a series of breakstem rivets, an example 90 of which is shown in detail in FIG. 17.

The body of the breakstem rivet 90, which is in this case shown before the actual riveting operation, extends axially along the axis A thereof through the aligned holes 54 provided for this purpose, on one side in the horizontal flange 66 and on the other side in the horizontal upper wall 36.

In addition to the assembly and clamping function thereof, each breakstem rivet 90, when inserted through two aligned holes 54, assures a relative "hole for hole" or "product-product" positioning between the component parts of which it ensures the fastening by riveting.

In a variant, a hole 54 can be circular or oblong shaped.

The presence of raised elements such as ribs makes it possible to maximize precision of control of the thickness of the glue or the adhesive forming a film between the surfaces to be bonded in order to guarantee the mechanical strength features of the bonding assembly, this spacing value or clearance "j" being obtained by the riveting ensuring that the parts to be assembled are pressed together.

This ensures a controlled, near-constant thickness of glue or adhesive that does not affect the shape or robustness of the cradle structure 22.

In this case, the cradle structure 22, in the vicinity of the rear end thereof, and on each longitudinal side rail 30, is also fitted with a rear right or respectively left housing 92.

Figure 6:
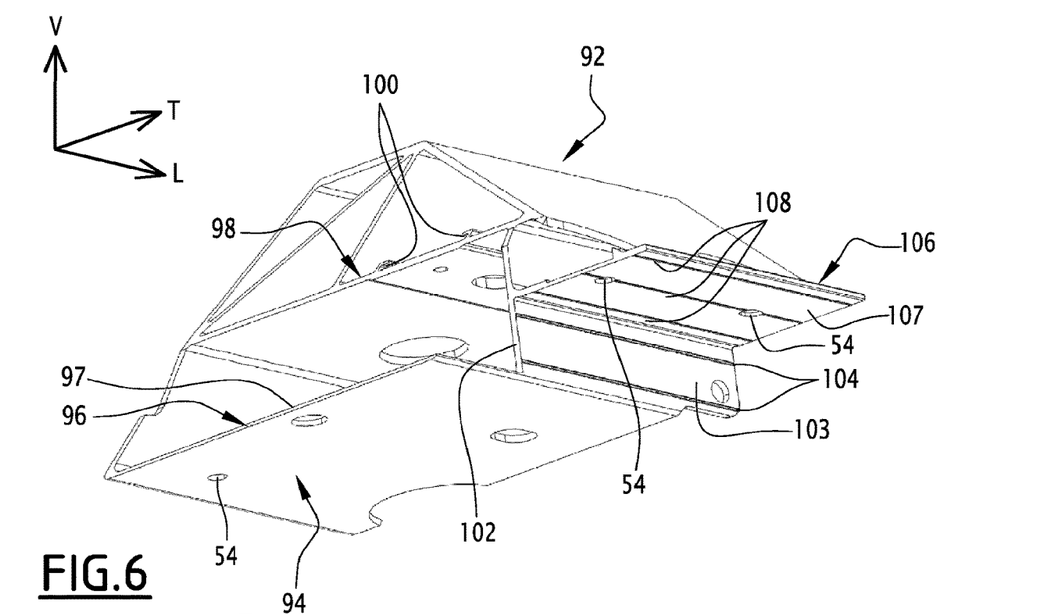
FIG. 6 is a perspective view of the rear left housing.

Each housing 92, one of which is shown in detail in FIG. 6, is in this case an extruded part anodized with aluminum Al 6063 T66.

The housing 92 is a part with an overall complex shape that notably has a horizontal lower wall 94 that has a rear longitudinal extension 96 of which the upper face 97 is smooth and designed to cooperate by bonding with a facing portion of the outer surface 73 of the horizontal lower wall 72 of the related rear cross member 34.

The housing 92 also has a horizontal upper wall 98 with two longitudinally oriented opposing slots 100 that are designed to receive a reinforcing fastening plate of the type described below with reference to the fastening of the rack housing 28 on the front cross member 32.

The housing 92 has a longitudinal vertical wall 102 that delimits a bonding surface 103 provided with two horizontal ribs 104 and that is designed to cooperate with a facing portion of the outer surfaces of the side wall 42 of the related longitudinal side rail 30.

The housing 92 also has a longitudinal horizontal assembly and fastening flange 106 that extends substantially halfway up between the horizontal walls 96 and 98 and of which the ribbed horizontal lower face 107 has three longitudinal ribs 108.

The ribbed surface 107 is intended to cooperate by bonding with a facing portion of the outer surface 37 of the horizontal upper wall 36 of the related longitudinal side rail 30.

At the front end thereof and on the upper face of the horizontal upper wall 56 of the front cross member 32, the cradle structure 22 is also fitted with a left, right front yoke 110.

Figure 7:
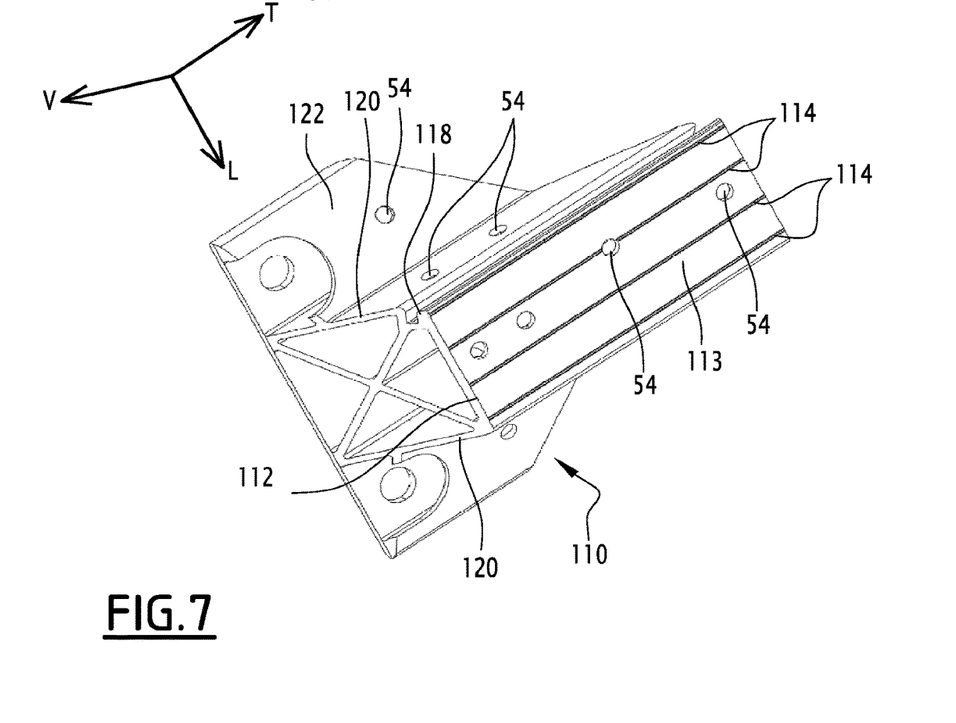
FIG. 7 is a perspective view of the front left yoke.
Figure 8:
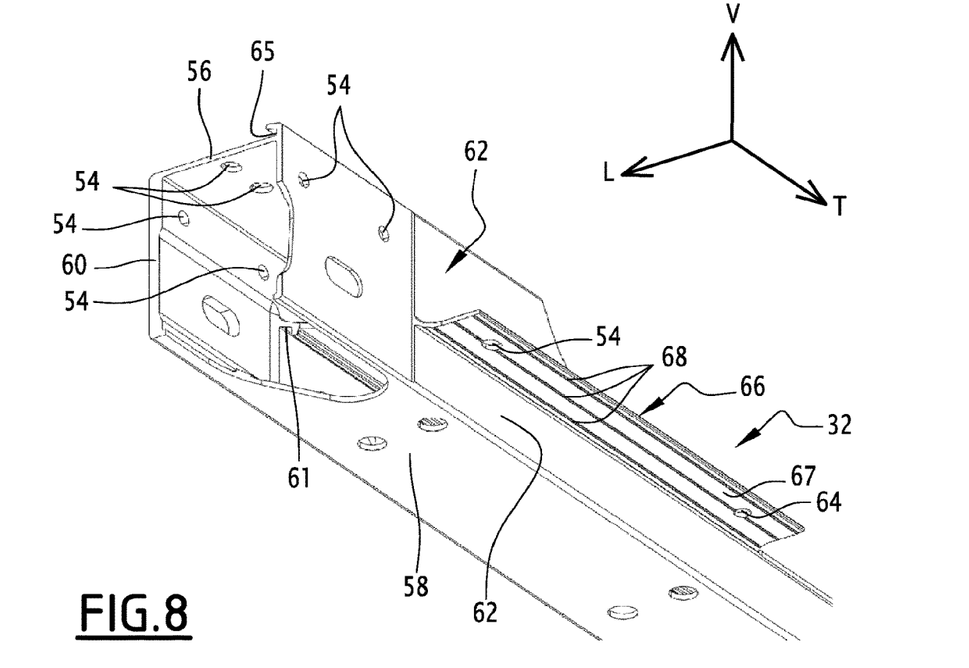
FIG. 8 is a partial perspective view of the front cross member of the cradle structure in FIGS. 3A and 3B.
Figure 9:
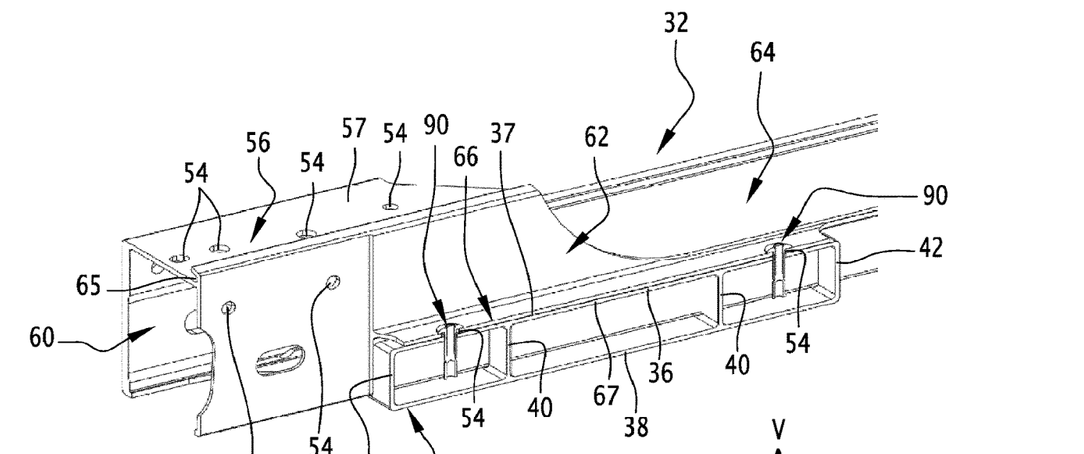
FIG. 9 is a detailed cross section perspective view taken on the vertical and transverse plane along line 9-9 in FIG. 5.

As shown in FIG. 7, a yoke 110 is in this case also an extruded part anodized with aluminum Al 6063 T66 that is fastened to the front cross member 32 essentially via the horizontal lower wall 112 thereof, which extends transversely.

The horizontal wall 112 has a lower bonding surface or face 113 that has four transverse ribs 114 to form a ribbed bonding surface that cooperates with the facing portion of the upper face 57 of the horizontal upper wall 56 of the front cross member 32.

To ensure good mechanical strength, the horizontal lower wall 112 of the yoke 110 has a lateral rib 118 that is seated in the related slot 65 of the upper wall 56 of the front cross member 32.

Each yoke 110 also has two vertical transverse side walls 120, each of which is extended by an inclined transverse flange 122.

Figure 13:
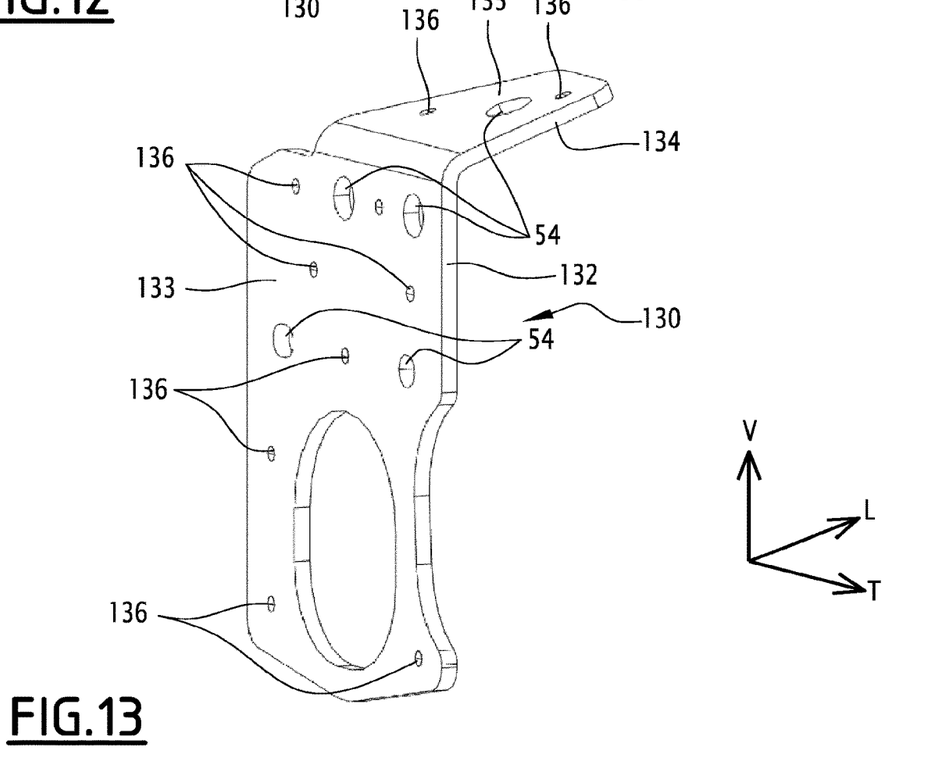
FIG. 13 is a perspective view of the rear right reinforcement plate of the front cross member shown in FIG. 12.

The fastening and the rigidity of a yoke 110, to the front and to the rear, is augmented by a reinforcement plate 130 with a matching profile comprising notably a transverse vertical wall 132 and an upper inclined flange 134.

Each reinforcement plate 130 has raised contacts 136, which perform the same role as the ribs described above, on its surfaces 133 and 135 that are designed to be bonded and riveted to the portions facing the related yoke 110 on one side and the outer surface of the front vertical wall 60 of the front cross member 32 on the other side.

Figure 14:
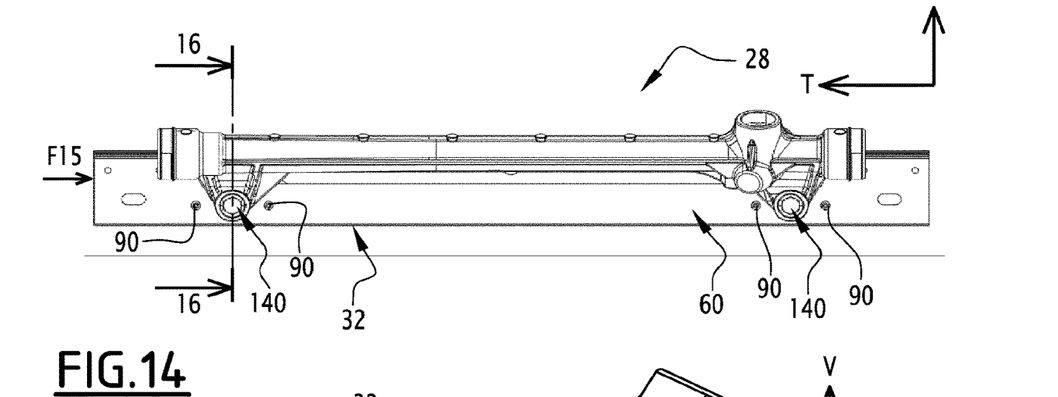
FIG. 14 is a front view of the casing of the steering rack fastened to the front cross member of the cradle structure in FIG. 1.

The housing 28 of the steering rack 26 is in this case fastened by screwing using two nut/bolt assemblies 140 arranged at the two opposing transverse ends of the rack housing 28.

Each nut/bolt assembly 140 has a bolt 142 that passes through a lug 144 belonging to the housing 28 that is pressed against the outer surface of the front transverse wall 60 of the front cross member 32.

Figure 16:
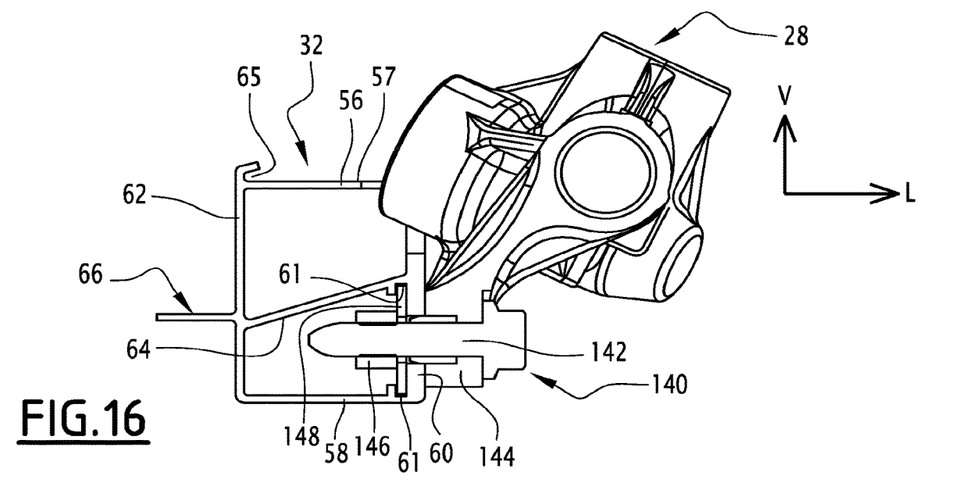
FIG. 16 is a cross section view taken on a vertical and longitudinal plane along line 16-16 in FIG. 14.

The bolt 142 is screwed into a matching nut 146 arranged inside the front cross member 32.

For the quality and rigidity of the assembly, an intermediate steel plate 148 is arranged inside the front cross member 32 between the nut 146 and the facing inner surface portion of the front transverse wall 60 of the front cross member 32.

In this case, and without limitation, the nut is welded to the reinforcement plate 148.

The reinforcement plate 148 is in this case a plate with a rectangular contour that is seated in two internal transverse horizontal slots 61 adjacent to the inner surface of the front transverse wall 60 of the front cross member 32.

The steel reinforcement plate 148 has a central hole to receive the body of the bolt 142 and is initially pre-positioned inside the front cross member 32 in which it can be held in the correct position by two rivets 90, in this case performing a single function of positional holding pin for the reinforcement plate 148.

The invention claimed is:

1. A motor vehicle cradle structure comprising:
   at least two longitudinal side rails made of aluminum or aluminum alloy that are spaced apart transversely, each of the longitudinal side rails including a horizontal upper wall and a horizontal lower wall that are linked together by two longitudinal internal vertical partitions and two longitudinal vertical side walls, the horizontal lower wall being longer than the horizontal upper wall to form two opposing extensions and
   at least one transversely oriented cross member that is made of aluminum or of aluminum alloy and that connects the two longitudinal side rails together,
   wherein the cross member is secured to the extensions of the longitudinal side rails in a non-dissociable manner by bonding in combination with a fastening using rivets, and
   wherein surfaces of the cross member and the extensions the longitudinal side rails that are bonded together are spaced apart by a determined dimensional clearance able to accept glue or an adhesive agent.

2. The structure as claimed in claim 1, wherein at least one bonding zone has a surface provided with raised elements that cooperate with a facing surface.

3. The structure as claimed in claim 2, wherein said raised elements determine a substantially constant dimensional clearance between said surface and said facing surface.

4. The structure as claimed in claim 2, wherein said surface provided with raised elements is a flat surface.

5. The structure as claimed in claim 2, wherein said surface is provided with at least one raised contact.

6. The structure as claimed in claim 5, wherein said flat surface is provided with a series of raised contacts distributed over said surface.

7. The structure as claimed in claim 2, wherein said surface is provided with at least one raised rib.

8. The structure as claimed in claim 7, wherein said surface is provided with a series of raised ribs distributed over said surface.

9. The structure as claimed in claim 1, wherein at least one of the horizontal upper wall and one of the extensions of each of the longitudinal side rails is bonded and fastened using rivets to the cross member.

10. The structure as claimed in claim 9, wherein said bonded surface is arranged at a longitudinal end of the longitudinal side rail.

11. The structure as claimed in claim 9, wherein said bonded surface is a flat surface.

12. The structure as claimed in claim 11, each of two wall portions of the horizontal upper wall and the extensions of each longitudinal side rail has a flat surface that are parallel and opposing and each of which is bonded and fastened using rivets to the cross member.

13. The structure as claimed in claim 1, wherein the cross member has at least one wall portion or one flange portion of which one surface is bonded and fastened using rivets to the longitudinal side rail.

14. The structure as claimed in claim 13, wherein said surface is arranged at a transverse end of the cross member.

15. The structure as claimed in claim 13, wherein said surface is a flat surface.

16. The structure as claimed in claim 15, wherein the cross member has two flange or wall portions, each of which has a flat surface, that are parallel and opposing and each of which is bonded and fastened using rivets to the longitudinal side rail.

17. The structure as claimed in claim 1, wherein the structure forms a motor vehicle front cradle, and said at least one cross member is a front cross member of the front cradle.

18. The structure as claimed in claim 1, further comprising at least one supplementary element for mounting a component belonging to a suspension of the vehicle, and said element is made of aluminum and is secured to a longitudinal side rail and/or to the cross member in a non-dissociable manner by bonding in combination with a fastening using rivets.

19. The structure as claimed in claim 1, further comprising at least one reinforcement plate that is made of aluminum or aluminum alloy and that is fastened to a longitudinal side rail and/or to the cross member in a non-dissociable manner by bonding in combination with a fastening using rivets.

20. The structure as claimed in claim 1, wherein the cross member includes an upper wall, a lower wall parallel to the upper wall, and side walls that connect the upper wall to the lower wall, and the upper wall of the cross member includes a flange that extends further in the longitudinal direction than the lower wall of the cross member such that the flange is the surface of the cross member that is bonded to the extensions the longitudinal side rails.

\* \* \* \* \*